Sept. 8, 1953 M. R. ELLIOTT ET AL 2,651,379
BRAKE MECHANISM AND HANDLE CONSTRUCTION
Filed May 4, 1950 4 Sheets-Sheet 1

INVENTOR.
MORRIS R. ELLIOTT
GEORGE L. TURNER
BY
ATTY.

Sept. 8, 1953

M. R. ELLIOTT ET AL 2,651,379

BRAKE MECHANISM AND HANDLE CONSTRUCTION

Filed May 4, 1950

INVENTOR.
MORRIS R. ELLIOTT
GEORGE L. TURNER
BY
ATTY.

INVENTOR.
MORRIS R. ELLIOTT
GEORGE L. TURNER

Sept. 8, 1953   M. R. ELLIOTT ET AL   2,651,379
BRAKE MECHANISM AND HANDLE CONSTRUCTION
Filed May 4, 1950   4 Sheets-Sheet 4

INVENTOR.
MORRIS R. ELLIOTT
GEORGE L. TURNER
BY
ATTY.

Patented Sept. 8, 1953

2,651,379

UNITED STATES PATENT OFFICE 2,651,379

BRAKE MECHANISM AND HANDLE CONSTRUCTION

Morris R. Elliott and George L. Turner, Buchanan, Mich., assignors to Clark Equipment Company, Buchanan, Mich., a corporation of Michigan Application May 4, 1950, Serial No. 160,084

6 Claims. (Cl. 180—12)

Our invention relates generally to hand trucks and, more specifically, is directed to a combination brake mechanism and handle construction for hand trucks.

At the present time, in the material handling field, wherein hand trucks are utilized for transporting goods, accidents frequently occur as a result of run-away trucks. The operator of a hand truck may lose control thereover should, for example, the steering handle slip accidentally from his hands or should he slip and fall while walking behind the truck, necessitating his release of the handle. This loss of control, coupled with the fact that drive is still being transmitted to the drive wheels of the truck, permits the latter to proceed in a haphazard manner until stopped by an obstacle in its path. Obviously, before being stopped the truck may cause serious damage to personnel in its path or commodities stacked nearby.

It is an object of our invention to provide a hand truck with a brake mechanism for braking the output shaft of the prime mover thereof, which brake mechanism is responsive to the position of the steering handle of the hand truck.

More specifically, we contemplate the provision of a combination brake mechanism and handle construction for a hand truck which will effect braking of the latter when the handle construction is disposed in either a substantially vertical position or in a substantially horizontal position. The handle construction when in an intermediate position between substantially vertical and horizontal planes is adapted to normally render the brake mechanism inoperative.

It will thus be observed that should the handle construction of our present invention be released by an operator of the hand truck, braking of the output shaft of the prime mover thereof would be effected preventing the hand truck from proceeding unattended. Our combination handle and brake mechanism provides what may be termed a "dead-man" control.

It is a further object of our invention to provide a brake mechanism which, in addition to being responsive to the position of the steering handle, may be actuated by an electromagnet assembly.

With the provision of an electromagnet assembly for effecting operation of the brake mechanism, the operator of the hand truck may selectively brake the hand truck without having to position the steering handle in either a substantially vertical or horizontal position.

It is a still further object of our present invention to provide a combination handle construction and brake mechanism which may be manufactured economically and one which may be easily adjusted for use under varying conditions.

Now, in order to acquaint those skilled in the art with the manner of constructing and utilizing the devices of our present invention, we shall describe in connection with the accompanying drawings a preferred embodiment of our present invention.

In the drawings:

Figure 5 is an enlarged view of the lower portion of the steering handle of the truck of Figure 1.

Figure 1:
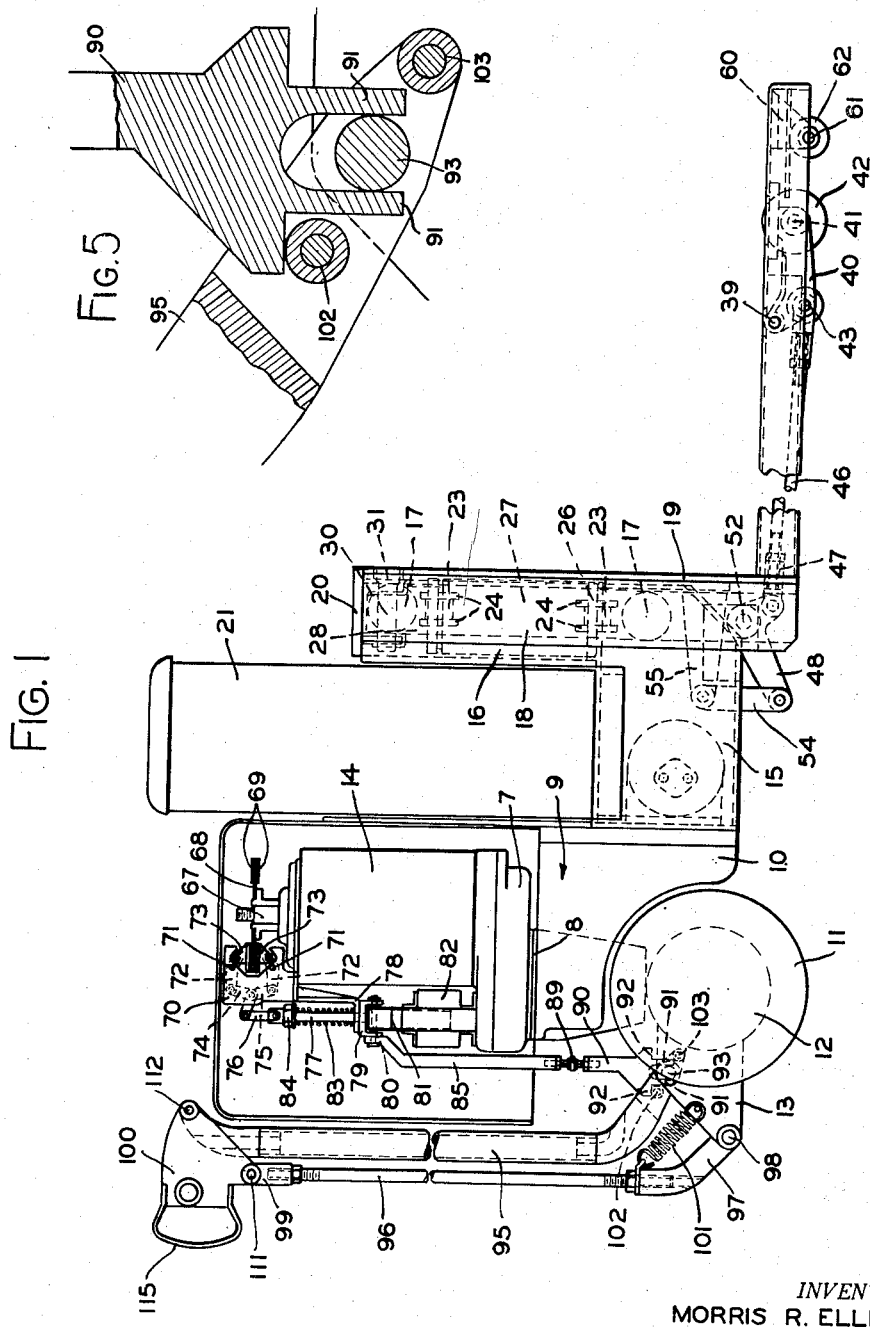
Figure 1 is a side elevational view of a hand truck incorporating the brake mechanism and handle construction of our present invention, with certain portions removed for the sake of clarity.

Referring now to the drawings, there is shown a hand truck comprising a main frame 10 in which, at the rear end thereof, is rotatably mounted the drive means, indicated generally by the reference numeral 9, for the hand truck. The drive means to which we make reference is fully shown and described in the copending application of Elmer J. Dunham, Serial No. 165,333, filed May 31, 1950. For the sake of clarity, the drive means 9 is shown diagrammatically in the present application. The drive means 9 comprises a pair of spaced drive wheels 11 mounted on drive axles (not shown) carried by the housing 12. Drive is effected to the drive axles of the wheels 11 through a vertically extending pinion shaft (not shown) journaled in a frame 8 rotatably mounted in the main frame 10. Secured to the upper end of the rotatable housing 8 is a gear casing 7 which, at its upper end, carries a prime mover 14 which, in the specific embodiment illustrated, comprises an electric motor. Drive is effected from the motor 14 to the pinion shaft (not shown) through gears disposed in the gear casing 7. The motor 14 is powered by means of batteries disposed within a housing member 21. The electric motor 14, gear casing 7, rotatable housing 8, housing 12, and drive wheels 11 are adapted to rotate as a unit for both powering and steering the hand truck. Secured to the housing 12 is a horizontally extending bracket member 13 to which is mounted the brake mechanism and handle construction of our present invention, which shall be described in detail hereinafter.

Secured to the main frame 10, adjacent each side thereof, are the vertical edges of the ends of the short legs 15 of a pair of forwardly extending upright L-shaped frame members 16. Rotatably mounted about axes extending transversely of the hand truck to each of the L-shaped frame members 16, laterally outwardly thereof, are a pair of guide rollers 17. Disposed at the outward sides of each of the L-shaped frame members 16, adjacent the forward ends thereof, are vertically extending C-shaped channel members 18. The forward legs of the C-shaped channel members 18 are interconnected by means of a vertically extending transverse plate member 19. The upper edges of the C-shaped channel members 18 are interconnected by means of a horizontal transversely extending plate member 20, which plate member 20 is secured along its forward edge to the upper edge of the vertically extending plate member 19.

The aforedescribed guide rollers 17, at their outer peripheries, engage the inner surfaces of the leg portions of the C-shaped channel members 18 for guiding the latter in vertical movement. The C-shaped channel members 18 are spaced from the sides of the L-shaped frame members 16 by means of guide rollers 23 rotatably mounted about axes extending lengthwise of the hand truck, between laterally extending spaced apart bracket members 24 secured to the outer surfaces of each of the L-shaped frame members 16.

Disposed rearwardly of the transversely extending vertical plate member 19, centrally thereof, are a pair of spaced apart lengthwise extending vertical support members 25 which are suitably secured to the main frame 10. Interconnecting the support members 25 is a transversely extending horizontal platform 26 to which is secured a vertically extending hydraulic piston and cylinder assembly comprising, a cylinder 27 and a piston rod 28. Disposed on each side of the upper end of the piston rod 28 are a pair of vertical transverse support members 29 which are secured at their upper edges to the horizontal plate member 20. Coaxially aligned openings are formed in the support members 29 and the upper end of the piston rod 28, through which openings is disposed the reduced end portion 30 of a cylindrical mounting pin. The cylindrical mounting pin has formed at its forward end an enlarged head portion 31 which abuts against the forward support member 29. The reduced end 30 of the mounting pin is held in the openings formed in the support members 29 and the piston rod 28, by means of a cotter pin 36 inserted through an opening in the reduced end 30, rearwardly of the rear support member 29. An opening is formed in the plate member 19 through which the mounting pin is adapted to be inserted during assembly of the piston rod 28 to the support members 29.

When fluid under pressure is admitted through suitable hose lines (not shown) to the cylinder 27, the piston rod 28 is forced upwardly. Upward movement of the piston rod 28 is transmitted to the transversely extending horizontal plate member 20, through the pin member 30, and the support members 29, thereby urging the plate member 20, together with the vertical transverse plate member 19 and the vertically extending C-shaped channel members 18, upwardly therewith. When the fluid is bled from the cylinder 27, the weight of the C-shaped channel members 18, transverse vertical plate member 19, and horizontal transverse plate member 20 force the piston rod 28 downwardly. Control of the fluid under pressure is effected by the operator of the hand truck through suitable control levers carried by the handle construction to be described in detail hereinafter, and it will thus be observed that the plate members 19 and 20, and the C-shaped channel members 18, may be selectively raised or lowered.

Secured to the vertical transverse plate member 19, adjacent the lower end thereof, and extending forwardly therefrom, are a pair of spaced load supporting frame members 38 which are adapted to be disposed beneath a pallet supported load for transporting the pallet from one location to another. The frame members 38 each have a narrow apron extending about the edges thereof. The corners of the forward ends of the frame members 38 are beveled so as to permit them to be easily manipulated beneath a pallet.

Extending transversely of each of the frame members 38, intermediate of the ends thereof, are shafts 39, the ends of which are journaled in the aprons of the frame members 38. The shafts 39, intermediate of their ends, are each adapted to support a pair of spaced apart bracket members 40, which bracket members 40 are laterally spread at their outer ends. Mounted in the outer ends of the brackets 40 are transversely extending shafts 41. Journaled on each of the shafts 41 are a pair of roller members 42.

Mounted intermediate of the ends of each pair of frame members 40 is a transversely extending shaft 43. Journaled on each shaft 43, centrally of the ends thereof, is a roller member 44. Disposed about each roller 44 and journaled on the shafts 43 are the legs of a fork member 45. Secured to each fork member 45 and extending rearwardly therefrom are the one ends of pull rods 46 which, at their other ends, have connection with fork members 47.

Pivotally mounted between the legs of each of the fork members 47 are the outer ends of the one legs of crank arms 48. The crank arms 48 are journaled on transversely extending shafts 52, which shafts 52 are secured at their one ends within the frame members 16 and at their other ends within frame members 53, which extend parallel to the frame members 16. The outer ends of the other legs of the crank arms 48 are pivotally secured to a pair of link members 54, which link members 54 are pivotally secured on each side of rearwardly extending bracket members 55 rigidly secured to the vertical transversely extending plate member 19.

Figure 2:
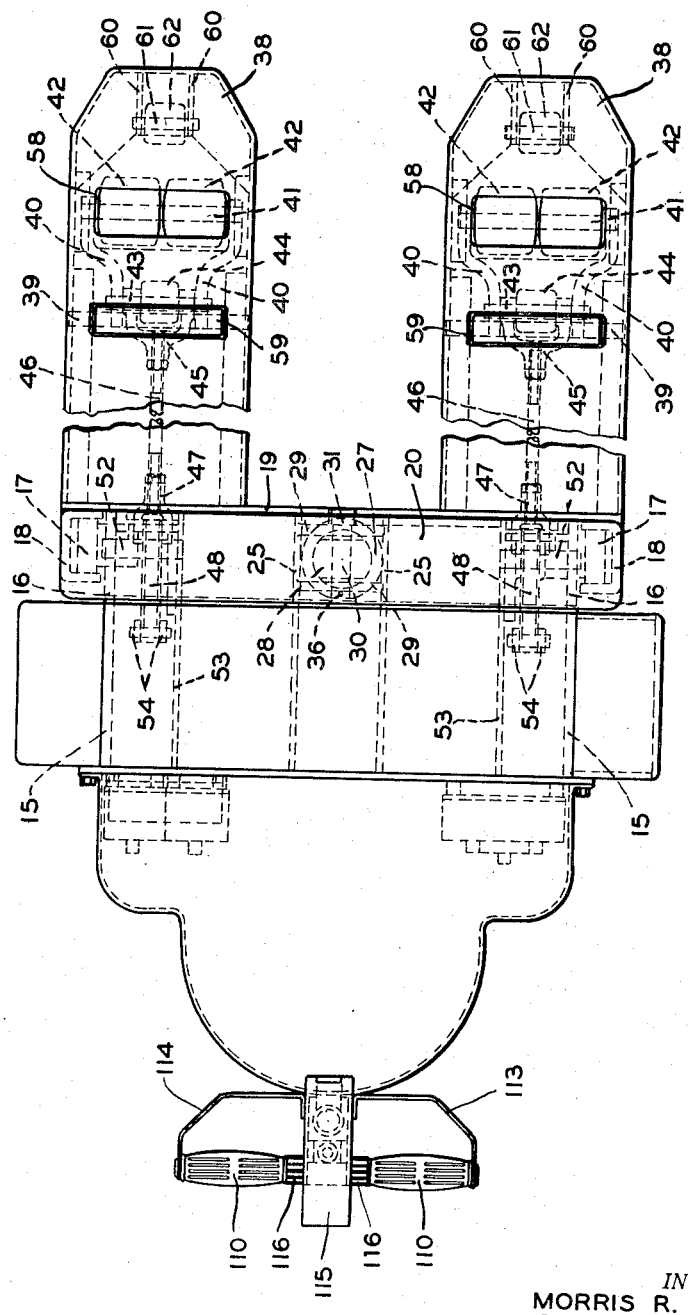
Figure 2 is a plan view of the hand truck shown in Figure 1.
Figure 3:
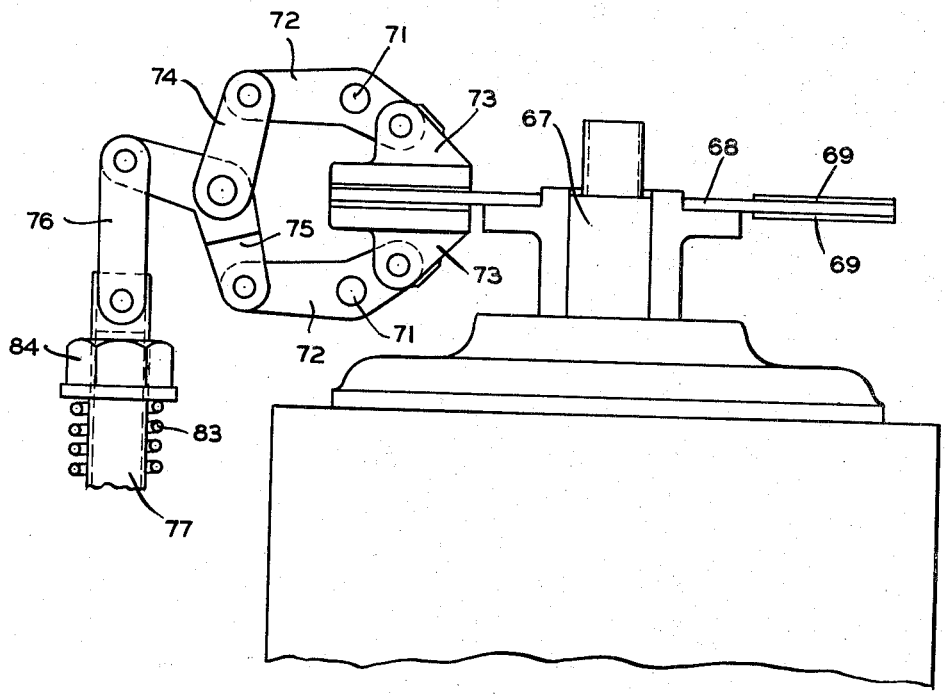
Figure 3 is an exploded view of the brake linkage shown in Figure 1.
Figure 4:
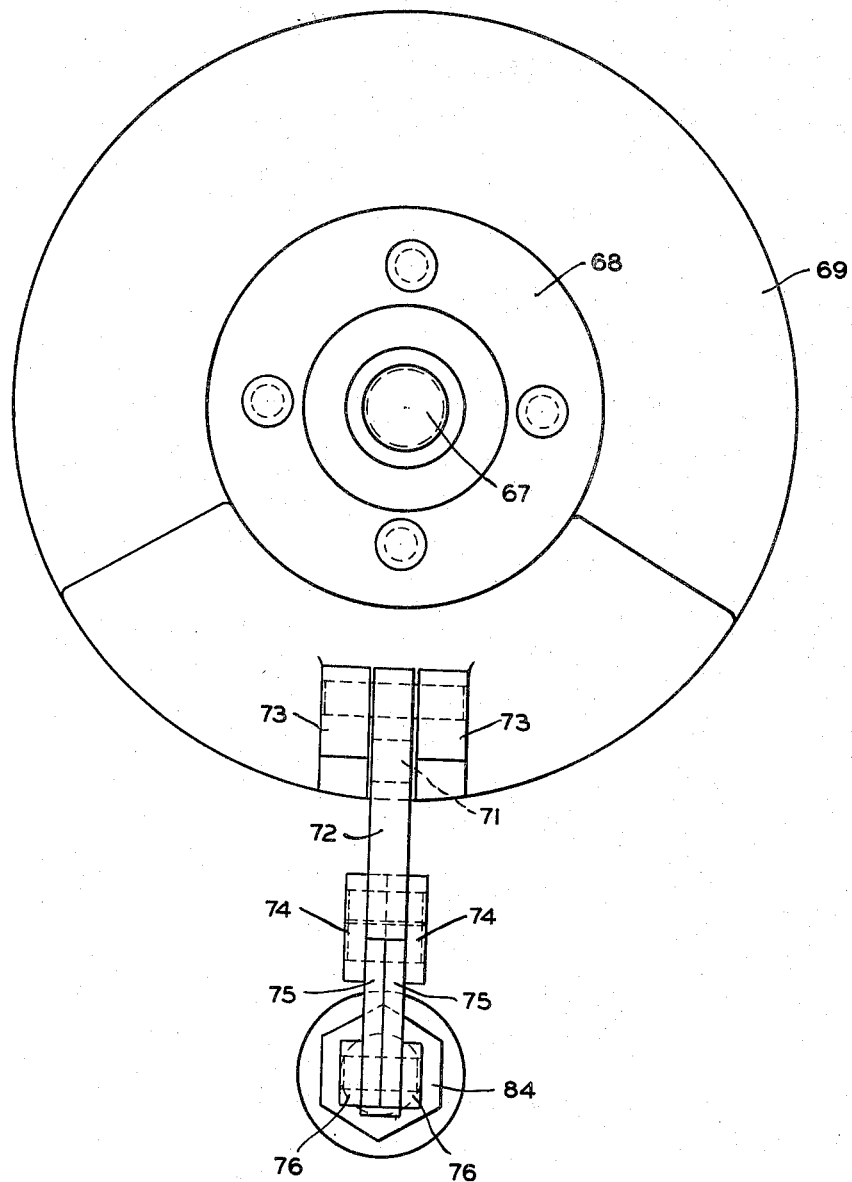
Figure 4 is a plan view of the brake linkage of Figure 3.

When the load supporting frames 38 are disposed closely adjacent the ground, as shown in Figures 1 and 2, the upper peripheral portions of the rollers 42 are adapted to be received within transversely extending slots 58 formed in the upper surfaces of the support frames 38. When the vertical transversely extending plate member 19 is raised, by means of the hydraulic cylinder 27 and piston rod 28, the bracket members 55 are urged upwardly therewith. Upward movement of the bracket members 55 causes the link members 54 to be pulled upwardly therewith. Upward movement of the links 54 causes the crank arms 48 to rotate clockwise about the shafts 52 which, in turn, pulls the draw rods 46 to the left, as viewed in Figure 1. Movement of the draw rods 46 to the left causes the frame members 40 to rotate clockwise about shafts 39. Transversely extending slots 59 are formed in the upper surfaces of the load supporting frames 38, into which slots the ends of the frame members 40 are adapted to be received when the frame members 40 are rotated clockwise. Clockwise rotation of the frame members 40 causes the roller members 42 to engage with the surface of the ground and the rollers 42, together with the aforedescribed dual rear drive and steering wheels 11 provide a three point suspension for the hand truck. When the vertical transversely extending plate member 19 is lowered, as aforedescribed, the bracket member 55 is lowered therewith. Downward movement of the bracket member 55 causes the link members 54 to move downwardly which urges the crank arms 48 to rotate in a counterclockwise direction about shafts 52 which, in turn, extends the draw rods 46 to the right, as viewed in Figure 1. Movement of the draw rods 46 to the right effects counterclockwise rotation of the frame members 40 about the shafts 39, thereby returning the rollers 42 to the position shown in Figure 1.

Lengthwise extending spaced apart vertical downwardly projecting support members 60 are secured to the underside of each of the load supporting frames 38. Mounted in the supporting members 60 are transversely extending shafts 61, upon which are journaled rollers 62.

In general, pallets which are provided for supporting loads are fabricated with two spaced apart horizontally extending surfaces. In order that the pallets may be raised from the ground when the load supporting frames 38 are disposed between the horizontally extending surfaces, transversely extending slots are formed in the lower surfaces of these pallets adjacent each end thereof. After the load supporting frames 38 have been disposed between the surfaces of a pallet, the rollers 42 are adapted to extend through one of the slots into contact with the ground. After the frames 40, supporting the rollers 42, have been rotated clockwise by means of the draw rod 46, the pallet is raised from the ground while the rollers 42 remain in contact with the ground through the slots formed in the pallet. It will thus be realized that the rollers 42, at all times, engage the ground for supporting the truck.

In order to prevent the lower edges of the apron disposed about the load supporting frames 38 from contacting the lower surface of the aforedescribed pallet, when the rollers 42 are disposed within the transverse slots therein, the rollers 43 and 61 are provided which are adapted to contact the lower surface of the pallet.

The aforedescribed electric motor 14 has a vertically extending output shaft 67 to which, at the upper end thereof, is secured a horizontally extending brake disc member 68. The disc member 68 has secured at its outer periphery a pair of ring members 69 at the upper and lower surfaces thereof, which ring members 69 are formed of a suitable frictional material, as, for example, asbestos.

Secured to the upper casing of the electric motor 14 are a pair of horizontally spaced apart vertically extending C-shaped support members 70. The horizontally extending legs of the C-shaped support members 70 are adapted to be disposed about the brake disc 68. Pivotally mounted at 71 between the C-shaped support members 70 adjacent the upper and lower portions thereof are a pair of bell cranks 72. Secured to the one ends of the bell cranks 72 are a pair of brake shoes 73 which are adapted to engage with the upper and lower surfaces of the frictional material 69 carried by the brake disc 68. The other end of the upper bell crank 72 is pivotally secured to a link member 74 adjacent one end thereof, and the other end of the lower bell crank 72 is pivotally secured to one end of a link member 75. The other end of the link 74 is pivotally secured to the link 75 intermediate of the ends thereof. The other end of the link 75 is pivotally secured to one end of a link 76 which, at its other end, is pivotally secured to a vertically extending rod 77.

The vertically extending rod 77 is adapted to be guided during vertical movement in an opening formed in a bracket member 78 secured to the casing of the motor 65. The lower end of the rod member 77 is secured to a horizontally extending inverted C-shaped channel member 79 which has a pin member 80 extending between the legs thereof. Pivotally mounted to the pin 80 intermediate of the legs of the C-shaped channel members is the upper end of a plunger 81 which is journaled for vertical movement within the coil of an electromagnet assembly 82, suitably mounted to the gear casing 7.

When the rod 77 is moved upwardly the link members 74 and 75 cause the ends of the bell crank 72 to rotate toward the brake disc 68, thereby disposing the brake shoes 73 into braking engagement with the frictional facings 69 of the brake disc 68. When the rod 77 is moved downwardly the link members 74 and 75 cause the ends of the bell cranks 72 to rotate away from the brake disc 68, thereby releasing the brake shoes 73 from engagement with the frictional facings 69 of the brake disc 68. A spring 83 is disposed concentrically about the rod 77 between the bracket 78 and a collar member 84 mounted adjacent the upper end of the rod member 77 for cushioning vertical movement of the latter. The upward force exerted by the spring 83 is less than the downward force exerted by the weight of the link 76, rod 77 and the associated brake actuating means to be described hereinafter. As a result, the spring 83 is employed solely to cushion movement of the rod 77 as the latter moves to a downward non-brake applied position.

When braking of the vehicle is desired, a suitable control lever, which admits current to the electromagnet coil 82, may be actuated by the operator of the truck. Current flow to the electromagnet coil 82 sets up a magnetic field between the coil 82 and plunger 81, urging the latter upwardly, together with rod member 77, thus disposing the brake shoes 73 into engagement with the frictional facings 69 of the brake disc 68. When the operator of the hand truck desires to release the brake shoes 73, he actuates the control lever interrupting current flow to the electromagnet coil 82, thereby permitting the plunger 81 and rod 77 to drop downwardly under the force of gravity. This downward movement of the rod 77 causes the ends of the bell cranks 72 to rotate away from the brake disc 68 releasing the brake shoes 73.

The aforedescribed brake mechanism of our present invention is also adapted to be responsive to the position of the handle of the hand truck.

Secured to the rear leg of the C-shaped channel member 79, about the pin 80, is a downwardly extending arm member 85 which is secured through a suitable adjusting screw 89 to an actuating member 90 which is mounted for rectilinear movement relative to the truck. The actuating member 90, adjacent its lower end, has formed integrally therewith a pair of spaced apart downwardly projecting fingers 91 and a pair of shoulders 92 adjacent each side thereof. The fingers 91 of the actuating member 90 are adapted to be disposed about a transversely extending pin member 93 which is carried by the rearwardly extending frame member 13.

The handle construction of our present invention is adapted to be disposed at the rear end of the hand truck, and comprises a vertically extending tubular post member 95 having the lower end thereof inclined angularly toward the truck and pivotally mounted to the pin member 93 mounted to the frame member 13. Disposed rearwardly of the post member 95 is a vertically extending tie rod 96 which, at its lower end, is threaded into a frame member 97 which is inclined angularly inwardly toward the frame 13 and is pivotally mounted thereto at 98. The tie rod 96 at its upper end is threaded into one end of an extension member 99, which extension 99 is pivotally secured at 111 to a hand grip frame 100. The post member 95 at its upper end is inclined angularly toward the truck and is secured at 112 to the hand grip frame 100.

The tubular post member 95 and the tie rod 96 are adapted to be maintained in parallel relationship in any position that the handle may assume anywhere, from a vertical to a horizontal position. It will thus be observed that the frames 100 and 13, tubular post 95, and tie rod 96 form a parallelogram. The handle construction is normally biased into a vertical position by means of a coil spring 101 secured between the frame member 97 and the frame member 13 of the truck.

Secured to the post member 95 adjacent the lower end thereof on either side of pin 93 are a pair of laterally extending pin members 102 and 103 which may be moved relative to the shoulder 92 of the actuating member 90. When the vertically extending tubular post member 95 is in a substantially vertical position, the rear laterally extending pin 102 is adapted to engage with the rear shoulder 92 of actuating member 90 so as to urge the later upwardly. Upward movement of the actuating member 90 causes the arm member 85 to move upwardly, thereby urging the C-shaped channel member 79 and rod 77 upwardly which, through the aforedescribed linkage system, causes the brake shoes 73 to engage with the frictional facing 69 of the brake disc 68 for braking the output shaft 67 of the electric motor 14. When the tubular post member 95 is moved downwardly and the laterally extending pin members 102 and 103 are disposed substantially in a horizontal plane, the actuating member 90 is permitted to move downwardly, thereby causing the arm member 85 and C-shaped channel member 79 to move downwardly therewith. Downward movement of the C-shaped channel member 79 causes the rod member 77 to move downwardly which, through the aforedescribed linkage system, releases the brake shoes 73 from engagement with the frictional facings 69 of the brake disc 68. When the tubular post member 95 is lowered so that it assumes a substantially horizontal position, the forward laterally extending pin member 103 rotates counterclockwise and engages the forward shoulder 92 of the actuating member 90, thereby urging the latter upwardly. This upward movement of actuating member 90, as aforedescribed, causes the brake shoes 63 to engage the frictional facings 69 of the brake disc 68 for braking the output shaft 67 of the electric motor 14.

It will thus be observed that when the handle construction of our present invention is disposed in either a substantially vertical or a substantially horizontal position the brake shoes 63 are applied to the frictional facings 69 of the brake disc 68 for braking the output shaft 67 of the electric motor 14. However, when the handle is not disposed in a substantially vertical or horizontal position, as would be the case when the hand truck is being driven forwardly, the brake shoes 73 are released from the brake disc 68, thereby permitting drive to be effected from the electric motor 14 to the drive wheels 11. It will be understood, however, that when the handle construction is in the latter position, the brake shoes 73 may be applied by means of the electromagnet 82. That is, when the electro-magnet 82 is energized, the plunger 81 and rod 77 are urged upwardly for applying the brake shoes 73 to the brake disc 68. During upward movement of the rod 77, the arm member 85 and actuating member 90 are moved upwardly. Such movement is permitted due to the lost motion mounting of the actuating member 90 relative to the pin members 93, 102 and 103 as may be clearly seen in Figure 5.

Suitable control handle grips are rotatably mounted to each side of the handle grip frame 100 and extend laterally therefrom. The handle grips 110 are rotatably mounted at their outer ends to brackets 113 and 114 secured to the handle grip frame 100. The handle grips 110 are connected in a conventional manner to electrical cables disposed within the tubular post member 95, which are suitably connected to the electromagnet 82 and the electric motor 14 for effecting operation thereof. The handle grips 110 adjacent their inner ends are provided with collar members 116 which are connected in a conventional manner to the auxiliary attachments of the hand truck, as, for example, the load lifting carriage. The outer ends of a U-shaped grip 115 are secured to the upper and lower edges of the handle grip frame 100. The grip 115 is provided for additional convenience for the operator of the truck during manipulation of the handle construction.

While we have shown and described what we believe to be a preferred embodiment of our present invention, it will be understood that various modifications and rearrangements may be made therein without departing from the spirit and scope of our present invention.

We claim:
1. In a hand truck having a prime mover therefor, and an output shaft driven by said prime mover, the combination of a brake disc mounted on said output shaft, at least one brake shoe for said brake disc for selectively braking the latter, linkage means for urging said brake shoe into and out of braking engagement with said brake disc, a vertically movable rod pivotally mounted at its upper end to said linkage means, said rod when in its uppermost position causing said linkage means to apply said brake shoe, a steering handle pivotally mounted to the hand truck, laterally projecting spaced pin members secured at their one ends in said steering handle adjacent each side of the pivotal mounting thereof whereby upon upward and downward swinging movement of said handle said pin members move in arcs, an actuating member mounted on the truck for rectilinear movement relative thereto and provided with shoulders relative to which the pin members on the end of the steering handle are adapted to move and engage to effect brake operating movement of the actuating member, a rigid arm member between said actuating member and said rod, one of said pin members being adapted to engage the adjacent shoulder of said actuating member to move the latter to a brake operating position when said steering handle is moved toward a substantially vertical position, and the other of said pin members being adapted to engage the adjacent shoulder of said actuating member to move the latter to a brake operating position when said steering handle is moved toward a substantially horizontal position.

2. The hand truck of claim 1 characterized by the provision of an electromagnet assembly comprising a core and a plunger journaled therein, the end of said plunger having connection with the lower end of said rod, and said core when electrically energized being adapted to urge said plunger upwardly thereby positioning said rod in its uppermost brake applying position.

3. In a hand truck having drive means for driving the same, the combination of brake means for said drive means for selectively braking the latter, a steering handle for the hand truck, linkage means between said steering handle and said brake means for applying the latter when said steering handle is disposed in a predetermined position in a vertical plane, one way lost motion connection means between said steering handle and said linkage means, an electromagnet assembly, said electromagnet assembly having connection with said linkage means between said steering handle and said brake means, and said electromagnet assembly when electrically energized being adapted to effect actuation of said brake means independently of movement of said steering handle.

4. In a hand truck having a prime mover therefor and an output shaft driven by said prime mover, the combination of brake means for said output shaft for selectively braking the latter, a steering handle for the hand truck, linkage means between said steering handle and said brake means for applying the latter when said steering handle is disposed in either a substantially vertical or horizontal position, one way lost motion connection means between said steering handle and said linkage means, an electromagnet assembly, said electromagnet assembly having connection with said linkage means between said steering handle and said brake means, and said electromagnet assembly when electrically energized being adapted to effect actuation of said brake means independently of movement of said steering handle.

5. In a hand truck having a prime mover therefor and an output shaft driven by said prime mover, the combination of a brake disc mounted on said output shaft, at least one brake shoe for said brake disc for selectively braking the latter, first linkage means for urging said brake shoe into and out of braking engagement with said brake disc, a steering handle for the hand truck, second linkage means between said steering handle and said first linkage means for causing the latter to apply said brake shoe when said steering handle is disposed in either a substantially vertical or horizontal position, one way lost motion connection means between said steering handle and said second linkage means, an electromagnet assembly, said electromagnet assembly having connection with said second linkage means between said steering handle and said first linkage means, and said electromagnet assembly when electrically energized being adapted to cause said first linkage means to apply said brake shoe independently of movement of said steering handle.

6. In a hand truck having a prime mover therefor, an output shaft extending substantially vertical and driven by said prime mover, the combination of a brake disc mounted on said output shaft and lying substantially in a horizontal plane, at least one brake shoe for said brake disc for selectively braking the latter, linkage means for urging said brake shoe into and out of braking engagement with said brake disc, a vertically movable rod pivotally mounted at its upper end to said linkage means, said rod when in its uppermost position causing said linkage means to apply said brake shoe, a steering handle pivotally mounted to the hand truck, laterally projecting spaced pin members secured at their one ends in said steering handle adjacent each side of the pivotal mounting thereof whereby upon upward and downward swinging movement of said handle said pin members move in arcs, an actuating member mounted on the truck for rectilinear movement relative thereto and provided with shoulders relative to which the pin members on the end of the steering handle are adapted to move and engage to effect brake operating movement of the actuating member, a rigid arm member between said actuating member and said rod, one of said pin members being adapted to engage the adjacent shoulder of said actuating member to move the latter to a brake operating position when said steering handle is moved toward a substantially vertical position, and the other of said pin members being adapted to engage the adjacent shoulder of said actuating member to move the latter to a brake operating position when said steering handle is moved toward a substantially horizontal position.

MORRIS R. ELLIOTT.
GEORGE L. TURNER.

References Cited in the file of this patent
UNITED STATES PATENTS

| Number | Name | Date |
| --- | --- | --- |
| 1,818,920 | Minturn | Aug. 11, 1931 |
| 2,327,583 | Framhein | Aug. 24, 1943 |
| 2,399,605 | Schroeder | Apr. 30, 1946 |
| 2,513,718 | Gfrorer | July 4, 1950 |